United States Patent
Cole et al.

(10) Patent No.: US 7,945,277 B2
(45) Date of Patent: May 17, 2011

(54) USE OF MEDIA TIMESTAMP TO INDICATE DELAYS IN PUSH-TO-TALK OVER CELLULAR GROUP CALLS

(75) Inventors: Gary Cole, Cary, NC (US); Jeff Griffin, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1329 days.

(21) Appl. No.: 11/460,053

(22) Filed: Jul. 26, 2006

(65) Prior Publication Data

US 2008/0039127 A1    Feb. 14, 2008

(51) Int. Cl.
*H04B 7/00* (2006.01)

(52) U.S. Cl. ........ 455/518; 455/517; 455/519; 455/520; 709/202; 709/203; 370/260; 370/261; 370/270

(58) Field of Classification Search .......... 455/517–520, 455/416; 709/202–203; 370/261, 260, 271
See application file for complete search history.

(56) References Cited

U.S. PATENT DOCUMENTS

| | | | |
|---|---|---|---|
| 6,021,433 A | 2/2000 | Payne et al. | |
| 6,778,493 B1 | 8/2004 | Ishii | |
| 2003/0153342 A1 | 8/2003 | Crockett et al. | |
| 2004/0228367 A1 | 11/2004 | Mosig | |
| 2005/0216549 A1* | 9/2005 | Amano et al. | 709/202 |
| 2005/0259754 A1 | 11/2005 | Ho et al. | |

OTHER PUBLICATIONS

International Preliminary Report on Patentability, corresponding to International Patent Application No. PCT/US2007/061357, dated Feb. 5, 2009.
Sony Ericsson Mobile Communications AB, PCT International Search Report, issued in corresponding International Patent Application No. PCT/US2007/061357, Oct. 4, 2007.
Sony Ericsson Mobile Communications AB, PCT Written Opinion, issued in corresponding International Patent Application No. PCT/US2007/061357, Oct. 4, 2007.
European Patent Office; Office Action; Oct. 7, 2010; issued in European Patent Application No. 07 756 537.2.

* cited by examiner

*Primary Examiner* — Edward Urban
*Assistant Examiner* — Fayyaz Alam
(74) *Attorney, Agent, or Firm* — R. Brian Drozd; Moore & Van Allen

(57) ABSTRACT

A method to indicate delays in a push-to-talk over cellular (PoC) group call may include offsetting a timestamp in a data stream being transmitted to a late listener to indicate a delay from when the data stream was transmitted to a first listener. The data stream includes data convertible to speech. The method may also include transmitting the data stream including the offset timestamp to the late listener.

23 Claims, 3 Drawing Sheets

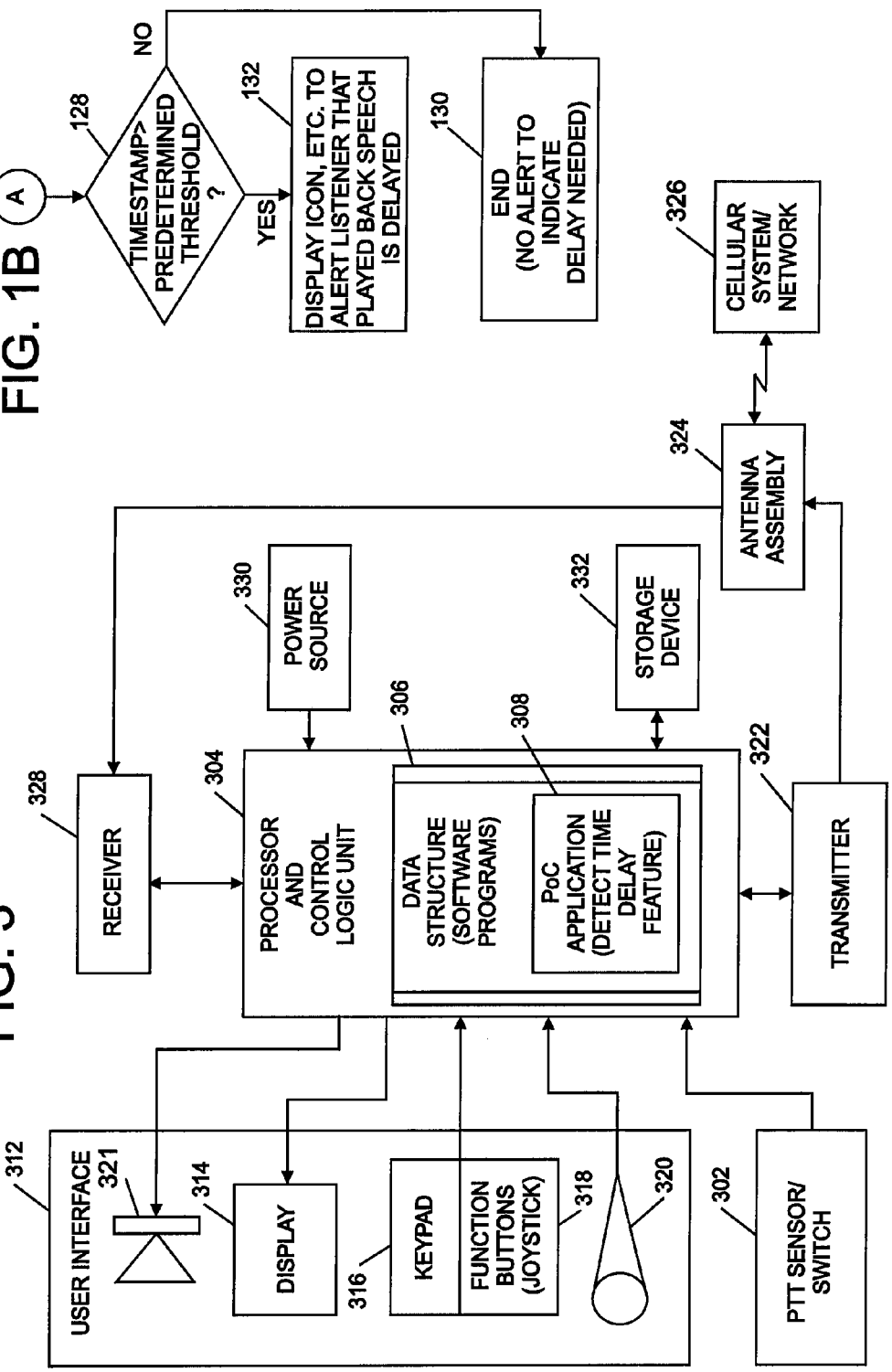

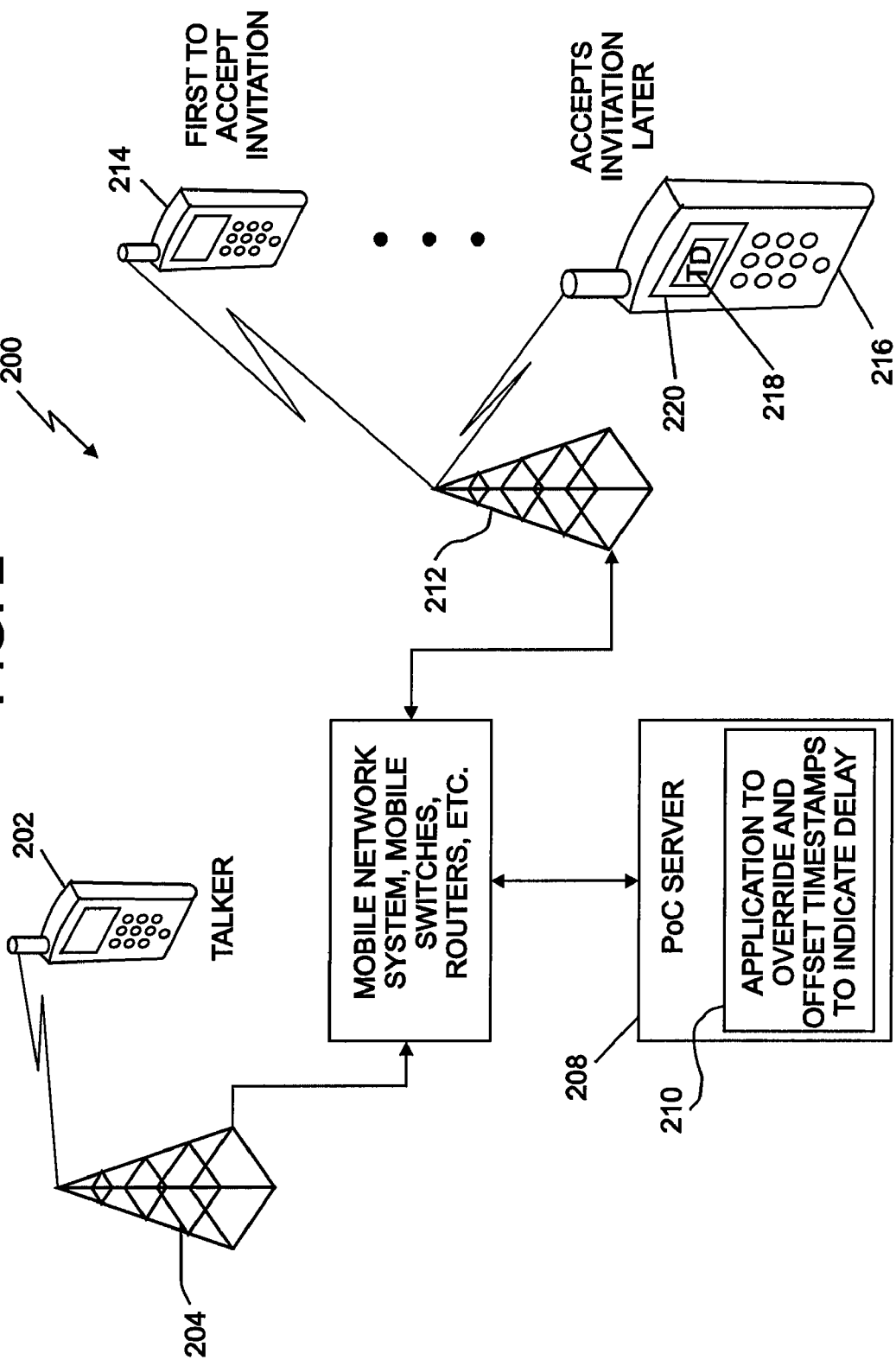

USE OF MEDIA TIMESTAMP TO INDICATE DELAYS IN PUSH-TO-TALK OVER CELLULAR GROUP CALLS

BACKGROUND OF THE INVENTION

The present invention relates to communications and methods and systems therefore and more particularly to use of media timestamp information to inform a user of a delay in a real-time push-to-talk over cellular (PoC) talk burst in a group call.

Push-to-talk over cellular (PoC) allows a user to initiate a session with two or more participants by transmitting a session invitation signal. The initiating user may start broadcasting speech as soon as another participant is first to accept the session invitation. The first participant to accept the session invitation will receive the media data stream embodying the speech in real-time. All other participants will receive the media stream delayed upon accepting the session invitation. Currently, users do not know that the speech they are listening to is delayed and may have already been responded to by the first participant.

BRIEF SUMMARY OF THE INVENTION

In accordance with an embodiment of the present invention, a method to indicate delays in a push-to-talk over cellular (PoC) group call may include offsetting a timestamp in a data stream being transmitted to a late listener or participant to indicate a delay from when the data stream was transmitted to a first listener or participant. The data stream includes data convertible to speech. The method may also include transmitting the data stream including the offset timestamp to the late listener.

In accordance with another embodiment of the present invention, a method to indicate delays in a PoC group call may include receiving a data stream. The method may also include indicating to a listener that speech generated from the data stream is delayed in response to a timestamp in the data stream being offset from a timestamp in a first data stream transmitted to a first listener or participant to accept an invitation to the PoC group call.

In accordance with another embodiment of the present invention, a communications device may include a PoC application to detect if a data stream is delayed. The communications device may also include a user interface to alert a listener that speech generated from the data stream is delayed in response to the PoC application detecting that the data stream is delayed.

In accordance with another embodiment of the present invention, a system may include a PoC server to offset a timestamp in a data stream being transmitted to a late listener to indicate a delay from when the data stream was transmitted to a first listener to accept an invitation to a PoC group call. The data stream includes data convertible to speech. The system may also include a base station to transmit the data stream to the late listener.

In accordance with another embodiment of the present invention, a computer program product to indicate delays in a PoC group call may include a computer useable medium having computer useable program code embodied therein. The computer useable medium may include computer useable program code configured to detect if a data stream is delayed. The computer useable medium may also include computer useable program code configured to alert a listener in response to detecting that the data stream is delayed.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 1A and 1B (collectively FIG. 1) are a flow chart of an example of a method to indicate delays in a PoC group call in accordance with an embodiment of the present invention.

FIG. 2 is a block schematic diagram of an exemplary system including a feature to indicate delays in a PoC group call in accordance with an embodiment of the present invention.

FIG. 3 is a block schematic diagram of an exemplary communications device including a feature to detect and indicate delays in a PoC group call in accordance with an embodiment of the present invention.

DETAILED DESCRIPTION OF THE INVENTION

Figure 1A:
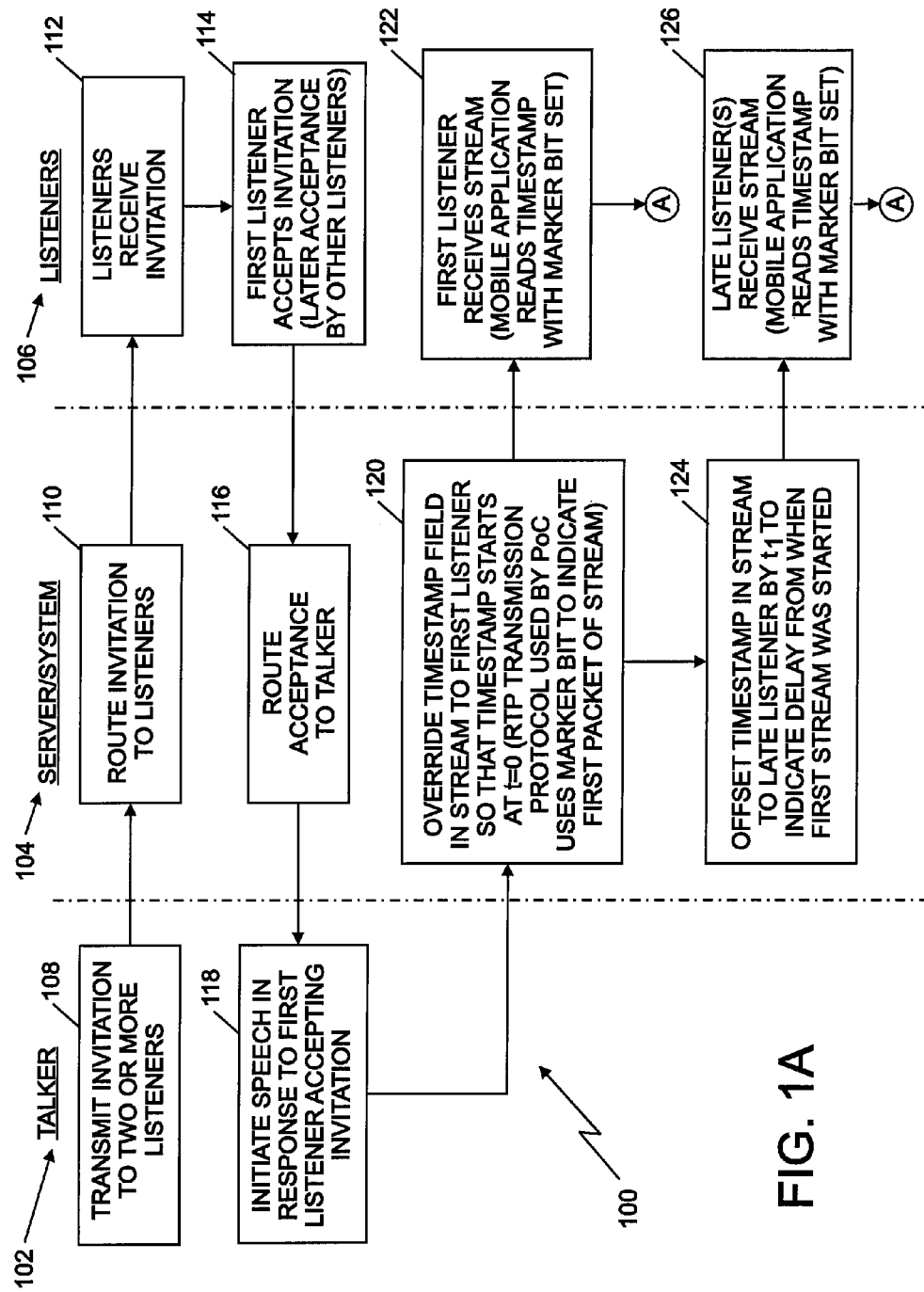

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer useable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include some or all of the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like.

However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIGS. 1A and 1B (collectively FIG. 1) are a flow chart of an example of a method 100 to indicate delays in a PoC group call in accordance with an embodiment of the present invention. FIG. 1 is divided into sections to illustrate the functions or operations that may be performed by different devices or entities in a PoC system to detect and alert a listener that the speech he is listening to is delayed. Accordingly, examples of functions or operations that may be performed by an initiating user or talker communications device are illustrated under the heading "TALKER" 102. Examples of functions or operations that may be performed by a server and/or communications system 104 are illustrated under the heading "SERVER/SYSTEM" 104. Examples of functions or operations performable by a first participant or listener communications device and by a late participant or listener communications device are illustrated under the heading "LISTENER" 106.

In block 108, an invitation to two or more listeners 106 or other participants may be transmitted by the talker's communications device 102. In block 110, the invitation may be routed to the appropriate invited listeners' or other participants' communications devices 106 by the system 104. In block 112, the listeners' communications devices 106 may receive the invitation.

In block 114, a first one of the listeners may accept the invitation. In block 116, the acceptance from the first listener to accept the invitation may be routed to the talker's communications device 102 by the system 104. Later acceptance by the other listeners or participants or late listeners may also be routed to the talker's communications device 102 by the system 104.

In block 118, speech may be initiated in response to receiving the acceptance from the first of the plurality of invited listeners to accept to the invitation. The first listener to accept may be defined or designated as the first listener and the other listeners who later accept the invitation may be defined or designated as late listeners.

In block 120, a timestamp field in a data stream to be transmitted to the first listener may be overridden so that the timestamp may designate that the speech generable from the data stream starts at a time t equal to zero (t=0). In other words, the speech generable from the data stream to the first listener may be in real-time. The real-time transport protocol (RTP) used by PoC uses a marker bit to indicate the first packet of a stream. Accordingly, the marker bit may be set to indicate the first packet of the stream being transmitted to the first listener and is in real-time. In block 122, the first listener receives the data stream. A PoC application or module in the first listener communications device may read the timestamp and the marker bit to determine that this is the first packet of the data stream.

In block 124, the timestamp in the data stream to late listeners may be offset by a predetermined amount ($t=t_1$) to indicate the delay from when the first data stream or data packet was started or transmitted to the first listener.

In block 126, a late listener or late listeners may receive the data stream with the offset timestamp. The mobile application or PoC application may read the timestamp with the marker bit set to indicate that the speech generable from the data stream is delayed. The marker bit is intended to be set in the first packet to each listener as per the RTP specification or protocol. The PoC application may use the marker bit to trigger the reading and comparison of timestamps within this first packet to make a determination of the lateness of the data.

In block 128, a determination may be made whether the timestamp in the data stream is greater than a predetermined threshold. If the timestamp is not greater than the predetermined threshold and the marker bit is set to indicate the first packet of the data stream, the method 100 may advance to block 130. In block 130, the process or method may end in the first listener communications device and no indication, icon or other alert need be generated or displayed since the data stream and speech generable are real-time and not delayed.

If the timestamp is greater than the predetermined threshold in block 128 and the marker bit is set to indicate that there is a delay in the data stream, as would be the case in the late listener communications devices, the method 100 may advance to block 132. In block 132, an icon may be displayed or other indication may be generated to alert the listener that the speech being played back is delayed.

Referring to FIG. 2, FIG. 2 is a block schematic diagram of an exemplary system 200 including a feature to indicate delays in a PoC group call in accordance with an embodiment of the present invention. The method 100 may be embodied in the elements illustrated in FIG. 2. A talker communications device 202 or initiating user may perform the operations indicated under TALKER 102 in FIG. 1. The talker communications device 202 may transmit the invitation to participate in a PoC group call to a base station 204 or the like.

The system 200 may include a mobile network or system. The base station 204 may be part of the mobile network or system 206. The mobile system 206 may also include mobile switches, routers and other infrastructure common to a cellular or wireless communications system or network to route the invitation to the appropriate invited listeners similar to that described under SERVER/SYSTEM 104 in FIG. 1.

The system 200 may also include a PoC server 208 to perform the PoC operations. The PoC server 208 may include an application or module 210 that may embody and perform at least some of the functions or operations similar to those described in FIG. 1 as being performed by the server or system 104.

The system 200 may also include one or more other base stations 212 for communicating with other participants or listeners 214 and 216 and for sending the invitation for the PoC group call. As is commonly known in wireless or cellular communications systems, mobile communications devices will communicate with a particular base station depending on the mobile communications device being within a geographical area or cell served by that particular base station. Accordingly the listeners 214 and 216 could also communicate with base station 204 if located within the geographical area or cell served by base station 204.

The functions or operations described and illustrated in FIG. 1 under LISTENERS 106 may be embodied or performed by the respective listener communications devices 214 and 216, wherein listener communications device 214 may be the first to accept the invitation to participate in the PoC group call and the listener communications device 216 may accept later. The later listener 218 may then present an icon 218 on a display 220 or generate some other alert that may include an audio alert or a combination of an audio and visual alert, to indicate that the speech being played back is delayed.

FIG. 3 is a block schematic diagram of an exemplary communications device 300 including a feature to detect and indicate delays in a PoC group call in accordance with an embodiment of the present invention. The communications devices 202, 214 and 216 of FIG. 2 may be embodied in the device 300. The communications device 300 may include a push-to-talk (PTT) switch or sensor 302 for PTT operation and PoC communications. The communications device 300 may also include a processor and control logic unit 304. The PTT sensor or switch 302 may be coupled to the processor and control logic unit 304 to control operation of the communications device 300 or to send signals to the communications device 300 to control operation thereof. The processor and control logic unit 304 may be a microprocessor or the like. The processor and control logic unit 304 may include data structures or software programs 306 including computer-executable or computer-readable instructions to control operation of the communications device 300 and its components. The data structure or software programs 306 may include computer-executable instructions for carrying out the PoC functionality similar to that described herein. For example, the data structures and software programs 306 may include a PoC module or application 308 to detect a delayed data stream and to alert a listener that speech being played back is delayed similar to that previously described. The functions and operations of the method 100 in FIG. 1 described with respect to the talker communications device 102 and listeners communications devices 106 may be embodied in the PoC application 308.

The communications device 300 may include an operator or user interface 312 to facilitate controlling operation of the communications device 300 including initiating and conducting phone calls, PoC calls, and other communications. The user interface 312 may include a display 314 to provide visual signals to a subscriber or user as to the status and operation of the communications device 300. The display 314 may be a liquid crystal display (LCD) or the like capable of presenting color images. The display 314 may provide information to a user or operator in the form of images, text, numerals, characters, a graphical user interface (GUI) and the like. An icon or other alert may be presented on the display 314 to alert the user that the speech being played back is delayed similar to that previously described.

The user interface 312 may also include a keypad 316 and function keys or buttons 318 including a pointing device, such as a joystick or the like. The keypad 316, function buttons and joystick 318 permit the user to communicate commands to the communications device 300 to dial phone numbers, initiate and terminate calls, establish other communications, such as access to the Internet, send and receive email, text messages and the like. The keypad 316, function buttons and joystick 318 may also be used to control other operations of the communications device 300, for example, enable special functions, such as the PoC functionality or features.

The user interface 304 may also include a microphone 320 and a speaker 321. The microphone 320 may receive audio or acoustic signals from a user or from an acoustic source, such as a radio, television or the like. The microphone 320 may convert the audio or acoustic signals to electrical signals. The microphone 320 may be connected to the processor and logic unit 304 wherein the processor and logic unit 312 may convert the electrical signals to baseband communication signals. The processor and control logic unit 304 may be connected to a transmitter 322 that may convert baseband signals from the main processor and control logic unit 304 to radio frequency (RF) signals. The transmitter 322 may be connected to an antenna assembly 324 for transmission of the RF signals to a communications medium or system, cellular system or network 326 or similar wireless communications system.

The antenna assembly 324 may receive RF signals over the air and transfer the RF signals to a receiver 328. The receiver 328 may convert the RF signals to baseband signals. The baseband signals may be applied to the processor and control logic unit 304 which may convert the baseband signals to electrical signals. The processor and control unit 304 may send the electrical signals to a speaker 321, which may convert the electrical signals to audio signals that can be understood by the user.

A power source 330 may be connected to the processor and control logic unit 304 to provide power for operation of the communications device 300. The power source 330 may be a rechargeable battery or the like. The communications device 300 may also include at least one data storage device 332. The data storage device 332 may store lists of phone numbers or other data. The data storage device 332 may be a computer-readable medium to store computer-executable or computer-usable instructions or data structures, such as data structures 306, to perform special operations or functions such as those described in accordance with embodiments of the present invention.

The communications device 300 may be operable in association with the communications system or medium 326 in accordance with an embodiment of the present invention. The communications system or medium 326 may be a mobile, wireless, cellular communications system or similar system.

The communications system 326 may connect the communications devices to another communication network, to a public switched telephone network or the like.

The communications device 300 may be a cordless telephone, cellular telephone, personal digital assistant (PDA), communicator, computer device or the like and is not unique to any particular communication standard. The layout and design illustrated in FIG. 3 is for purposes of explaining the present invention and the present invention is not limited to any particular design. While the communications device 300 illustrated in FIG. 3 is a wireless communications device, the present invention may also be applicable to wired or hard wired communication devices and systems.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method (100) to indicate delays in a PoC group call, comprising:
   offsetting a timestamp (124) in a data stream being transmitted to a late listener (216) to indicate a delay (124) from when the data stream was transmitted to a first listener (214), wherein the data stream includes data convertible to speech; and
   transmitting the data stream including the offset timestamp to the late listener (124, 126, 216).

2. The method (100) of claim 1, further comprising providing an alert (132) to the late listener (216) that speech generated from the data stream is delayed in response to the timestamp in the data stream being offset (128).

3. The method (100) of claim 1, further comprising:
   determining if the timestamp in the data stream is greater than a predetermined threshold (128); and
   displaying an icon to alert the late listener that speech generated from the data stream is delayed (132) in response to the timestamp being greater than the predetermined threshold (128).

4. The method (100) of claim 1, further comprising:
   transmitting an invitation to a plurality of potential listeners to join the PoC group call (108); and
   initiating speech in response to the first listener (214) accepting the invitation (118), wherein the first listener (214) is a first one of the plurality of potential listeners to accept the invitation (114).

5. The method (100) of claim 4, further comprising overriding a timestamp field in the data stream being sent to the first listener (214) to cause the timestamp to start at zero (120).

6. The method (100) of claim 5, further comprising setting a marker bit in the data stream being transmitted to the first listener (214) to indicate a first packet of the data stream (120).

7. The method (100) of claim 4, wherein the timestamp is offset in the data stream being transmitted to the late listener (216) by a predetermined time to indicate a delay from when the first stream was started (124).

8. A method (100) to indicate delays in a PoC group call, comprising:
   receiving a data stream (126); and
   indicating to a listener (216) that speech generated from the data stream is delayed (132) in response to a timestamp in the data stream (124) being offset from a timestamp in a first data stream (122) transmitted to a first listener (122, 214) to accept an invitation to the PoC group call.

9. The method (100) of claim 8, further comprising displaying an icon (132) to alert the listener that speech is delayed.

10. The method (100) of claim 8, further comprising determining if the timestamp is greater than a predetermined threshold (128).

11. The method (100) of claim 8, further comprising reading a marker bit in the timestamp to determine if the speech is delayed (122, 126).

12. A communications device (300), comprising:
   a PoC application (308) to detect if a data stream is delayed; and
   a user interface (312) to alert a listener that speech generated from the data stream is delayed in response to the PoC application (308) detecting that the data stream is delayed,
   wherein the PoC application (308) comprises a component to read a timestamp with a marker bit (122, 126) and to provide the alert (132) that speech generated from the data stream is delayed in response to the timestamp in the data stream being offset.

13. The communications device (300) of claim 12, further comprising a display (220, 314), and wherein the alert comprises an icon (218) presentable on the display (220, 314).

14. The communications device (300) of claim 12, further comprising:
   a receiver (328) to receive an invitation (112) to participate in a PoC group call; and
   a transmitter (322) to accept the invitation (114) to participate in the PoC group call.

15. A system (200), comprising:
   a PoC server (208) to offset a timestamp in a data stream (124) being transmitted to a late listener (216) to indicate a delay from when the data stream was transmitted to a first listener (214) to accept an invitation to a PoC group call, wherein the data stream includes data convertible to speech; and a base station (212) to transmit the data stream (124, 126) to the late listener (216).

16. The system (200) of claim 15, wherein the PoC server (208) comprises a component (210) to override a timestamp field in the data stream being sent to the first listener (214) to cause the timestamp to start at zero (120).

17. The system (200) of claim 15, wherein the PoC server (208) comprises a component (210) to set a marker bit in the data stream being transmitted to the first listener to indicate a first packet of the data stream (120).

18. The system (200) of claim 15, wherein the timestamp is offset in the data stream being transmitted to the late listener (216) by a predetermined time to indicate the delay from when the first stream was started (124).

19. The system (200) of claim 15, further comprising an application operable (210) on the PoC server (208) to override and offset timestamps (124) to indicate the delay in speech at the late listener (216).

20. A computer program product (100) to indicate delays in a PoC group call, the computer program product (100) comprising:

a non-transitory computer useable medium (304) having computer useable program code (306) embodied therein, the non-transitory computer useable medium (304) comprising:

computer useable program code (308, 128) configured to detect if a data stream is delayed;

computer useable program code (308, 132) configured to alert a listener in response to detecting that the data stream is delayed (128); and computer useable program code (308) configured to read a timestamp with a marker bit (124) and to provide an indication that speech generated from the data stream is delayed in response to the timestamp in the data stream being offset (132).

21. The computer program product (100) of claim 20, further comprising computer useable program code (308) configured to offset a timestamp in a data stream (124) being transmitted to a late listener (216) to indicate a delay from when the data stream was transmitted (122) to a first listener (214), wherein the data stream includes data convertible to speech.

22. The computer program product (100) of claim 20, further comprising computer useable program code (308) configured to provide an indication (132) to a late listener that speech generated from the data stream is delayed in response to a timestamp in the data stream being offset (124).

23. The computer program product (100) of claim 20, further comprising:

computer useable program code (308) configured to determine if a timestamp in the data stream is greater than a predetermined threshold (128); and computer useable program code (308) configured to display an icon (132, 218) to alert a late listener (216) that speech generated from the data stream is delayed in response to the timestamp being greater than the predetermined threshold (128).

\* \* \* \* \*